United States Patent
Georgakopoulos

(10) Patent No.: US 8,474,328 B2
(45) Date of Patent: Jul. 2, 2013

(54) DEVICE MEASURING THE WIND SPEED AND THE WIND DIRECTION

(75) Inventor: Athanasios Georgakopoulos, Piraeus (GR)

(73) Assignee: Enallaktiki Energiaki SA, Amfiklia Viotias (GR)

( * ) Notice: Subject to any disclaimer, the term of this patent is extended or adjusted under 35 U.S.C. 154(b) by 178 days.

(21) Appl. No.: 12/866,642

(22) PCT Filed: Feb. 4, 2009

(86) PCT No.: PCT/GR2009/000008
§ 371 (c)(1),
(2), (4) Date: Aug. 6, 2010

(87) PCT Pub. No.: WO2009/098525
PCT Pub. Date: Aug. 13, 2009

(65) Prior Publication Data
US 2011/0000314 A1     Jan. 6, 2011

(30) Foreign Application Priority Data
Feb. 7, 2008   (GR) .................................. 080100084

(51) Int. Cl.
*G01P 5/06* (2006.01)
(52) U.S. Cl.
USPC ........................................................ 73/861.85
(58) Field of Classification Search
USPC ........................................ 73/861.5, 170.05
See application file for complete search history.

(56) References Cited

U.S. PATENT DOCUMENTS

| | | | |
|---|---|---|---|
| 3,387,491 A | 6/1968 | Adams | |
| 3,713,336 A * | 1/1973 | Bernstein et al. | 73/170.11 |
| 3,791,211 A | 2/1974 | Dobesch | |
| 3,815,413 A * | 6/1974 | Marshall et al. | 73/170.16 |
| 3,893,337 A * | 7/1975 | Jones | 73/170.09 |
| 4,827,425 A * | 5/1989 | Linden | 700/225 |

(Continued)

FOREIGN PATENT DOCUMENTS

| | | |
|---|---|---|
| EP | 0813066 A1 | 12/1997 |
| EP | 1398637 A1 * | 3/2004 |
| WO | 0177622 A2 | 10/2001 |

OTHER PUBLICATIONS

International Search Report dated May 15, 2009 for International Application Serial No. PCT/GR2009/000008, International Filing Date Feb. 4, 2009 consisting of 8 pages.

*Primary Examiner* — Lisa Caputo
*Assistant Examiner* — Jamel Williams
(74) *Attorney, Agent, or Firm* — Christopher & Weisberg, P.A.

(57) ABSTRACT

A device measuring the speed or the direction of the wind, characterized in that it consists of the main body (1), which is hollow and can be divided into two parts and an electronic circuit (9) can be placed into the inside part thereof, and of the rotor (2) or the vane tail (3). The main body (1) is of curved shape and has a tall neck so as the rotor (2) or the vane tail (3) to be placed in such a position in order for the measurements not to be affected and it is divided into two parts the lower part (6) and the upper part (7). The upper part (7) of the main body (1) is hollow and the axle (8) is placed into the inside part thereof, where the rotor (8) or, alternatively, the vane tail (9) are mounted, depending on the measurement we wish to achieve. The device is mounted in the meteorological station of a supporting arm.

9 Claims, 4 Drawing Sheets

U.S. PATENT DOCUMENTS

| | | | |
|---|---|---|---|
| 5,231,876 A * | 8/1993 | Peet et al. | 73/170.08 |
| 5,502,377 A * | 3/1996 | Freund | 324/175 |
| 5,918,277 A * | 6/1999 | Yilmaz | 73/170.17 |
| 6,158,278 A * | 12/2000 | Klinefelter | 73/170.05 |
| 6,164,128 A * | 12/2000 | Santa Cruz et al. | 73/170.11 |
| 6,895,812 B2 * | 5/2005 | Dahlberg | 73/170.01 |
| 2009/0072816 A1 * | 3/2009 | Schrubbe et al. | 324/207.2 |
| 2010/0001720 A1 * | 1/2010 | Mizutani et al. | 324/207.25 |
| 2010/0209246 A1 * | 8/2010 | Migliori | 416/1 |
| 2011/0000314 A1 * | 1/2011 | Georgakopoulos | 73/861.85 |

* cited by examiner

DEVICE MEASURING THE WIND SPEED AND THE WIND DIRECTION

CROSS-REFERENCE TO RELATED APPLICATIONS

This application is a Submission Under 35 U.S.C. §371 for U.S. National Stage Patent Application of International Application Number: PCT/GR2009/000008, filed Feb. 4, 2009 entitled DEVICE MEASURING THE WIND SPEED AND THE WIND DIRECTION, which claims priority to Greek Application Number GR20080100084, filed Feb. 7, 2008, the entirety of both which are incorporated herein by reference.

FIELD OF THE INVENTION

The present invention refers to a device (sensor) which measures either the wind speed or the wind direction depending on the setup (initialization) of the sensor and the component which is attached on the top of it. The main body (1) of the device consists of two parts, upper (7) and lower (6) which can be assembled together by means of annular thread. Inside it there is mounted an electronic circuit (9) which holds a programmable CPU and a magnetic encoder (5). The electronic circuit (9) can be programmed to operate in two different modes depending on the desired measured quantity wind speed or wind direction. Each mode is selected during the setup (initialization) of the device (sensor) and the attachment of the relevant top component (rotor (2) or vane tail (3)) on the top of it.

DESCRIPTION OF RELATED ART

Until today in the prior art no similar technology has ever been presented in this kind of devices. In particular, until today no device that can measure wind speed is or wind direction has ever been manufactured with the same principle of operation. On the contrary there exist several devices for the measurement of the wind speed the operation of which is based on totally different principles of operation compared to the device of my invention. In particular, the other devices either use optical encoders, or a switch, or a rotating coil attached to the axle of the rotor. The ones using an optical encoder are referred as the most expensive.

The major advantage of my invention is that it operates sufficiently and withstands the specific characteristics of complex terrains such as the Greek terrain which is characterized by high wind potential, high turbulence, and heavy snowfalls. Furthermore, it can be programmed to operate either as a wind speed sensor or as a wind vane. The introduction of a <<clever>> on chip logic which allows the sensor to operate in two different modes resulted my invented device.

The main advantage of my invention is the property of transformation of a single device to measure the wind speed or the wind direction depending on the setup mode selection and the attachment of the relevant top component (rotor (2) or vane tail (3)) on the top of it. In addition, the rotor (2) used for the wind speed measurement has a pioneer design which aims to the improvement of the mechanical features of the arms and the rotors so as not to break during their operation while keeping excellent performance under harsh environment conditions. Also the vane tail (3) has been optimized to increase the strength of the mechanical features by embedding the aluminium tail (12) inside the plastic tail head during the injection molding process.

BRIEF DESCRIPTION OF THE DRAWINGS

The technical, constructional and functional characteristics of the invented device, according to the present invention, will be comprehensive to those skilled in the art, with reference to the accompanying drawings of the present specification, which show an indicative industrial preferred embodiment of the present invention.

In particular.

Figures 1A, 1B:
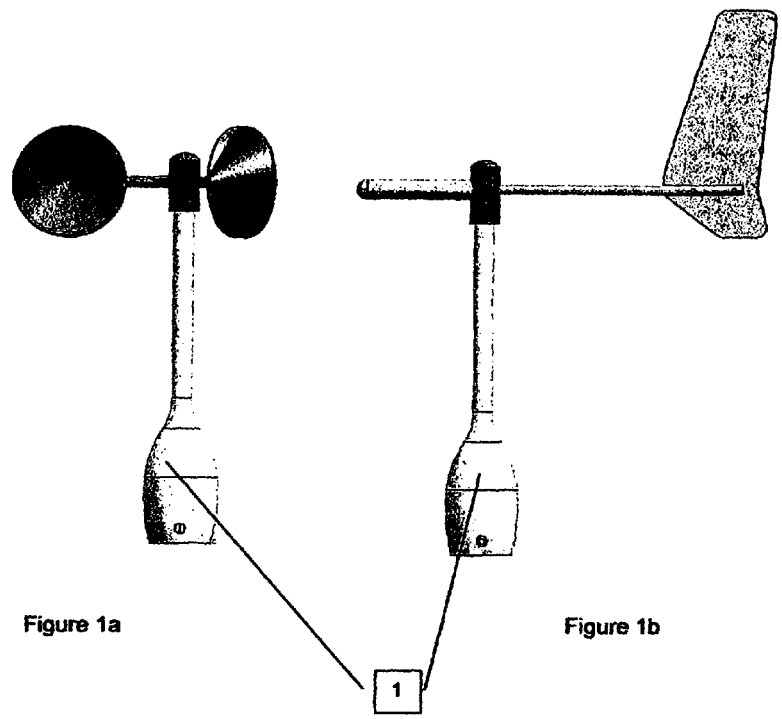
FIGS. 1a and 1b is, a perspective view of the device of the invention attached with the two alternative top components, rotor (2) used for the wind speed measurement and the vane tail (3) used for the wind direction measurements respectively.
Figure 2:
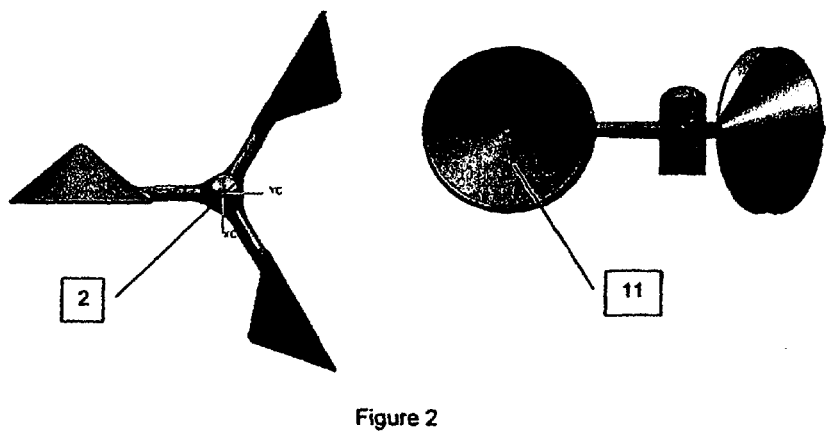
FIG. 2 shows two views of the rotor (2) used for the wind speed measurement.
Figure 3:
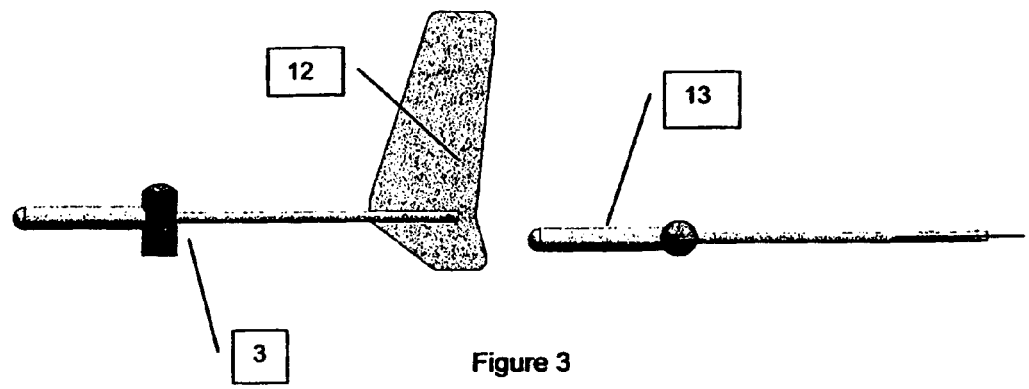
FIG. 3 also shows two views of the vane tail (3) used for the wind direction measurements.
Figure 4:
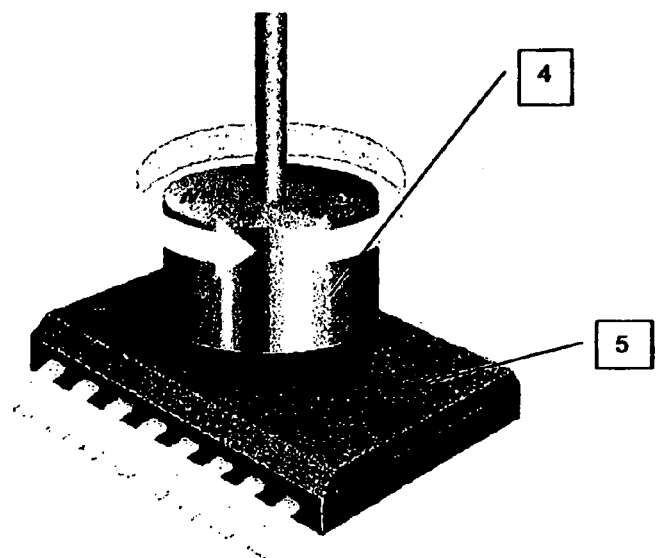
FIG. 4 shows a bipolar magnet (4) located inside the main body of the device (1) rotated above the magnetic encoder (5) of the electronic circuit (9).
Figure 5:
FIG. 5 shows the two parts of the main body, the lower part (6) and the upper part (7).
Figure 6:
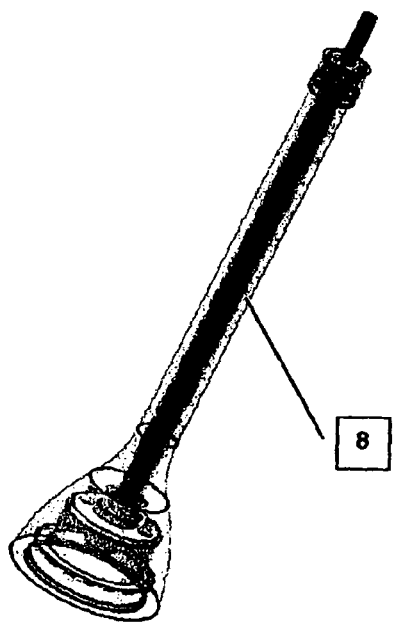
FIG. 6 shows the upper part of the housing body (7) with the axle (8) located inside it.
Figure 7:
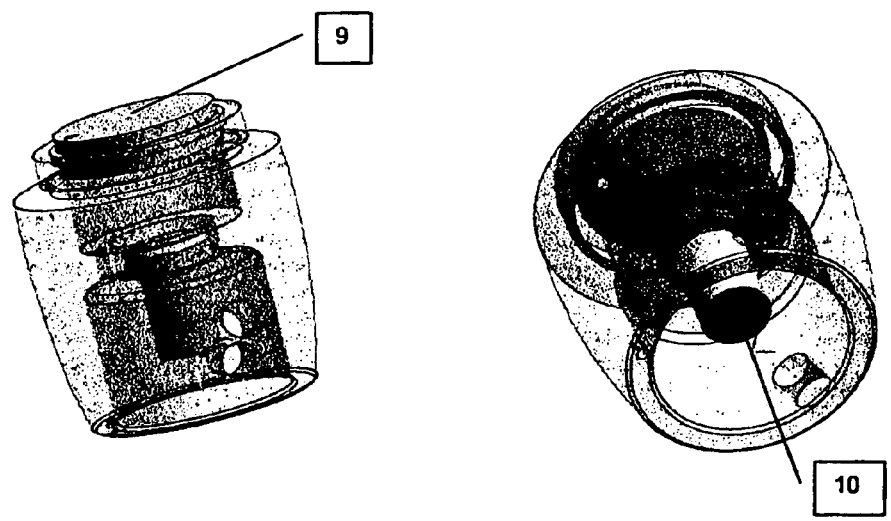
FIG. 7 shows two views of the lower part of the housing body (6) with the electronic circuit (9) and the connection plug (10).

The drawings show an example of the present invention. Hereinafter, same reference numbers of the main parts of the object refer to the corresponding reference numbers of those parts in the accompanying drawings. The parts are not depicted to scale but simply in dimensions proportional to one another.

DESCRIPTION OF THE PREFERRED EMBODIMENTS

According to the selected indicative embodiment of the invention, the invented device has a main body (1) consisted of two parts the lower part (6) and the upper part (7). These parts are made of aluminum and can be assembled together by means of annular thread. The two components attached on the main body, depending on the measured physical quantity, are the rotor (2) and the vane tail (3).

The upper part (7) is hollow and incorporates a tall neck. Inside this part there rotates an axle (8) where depending on the measured physical quantity; a rotor (2) is attached for measuring the wind speed or a vane tail (3) is attached for measuring the wind direction. These components rotate on the top of the long body neck in order to minimize any interference of the wind flow over the body of the device to the measurement. The electronic circuit (9) holds a programmable CPU and a magnetic encoder (5) and is placed inside the lower part (6). On the top of the magnetic encoder (5) rotates a bipolar magnet (4) which is attached on the bottom of the axle (8) inside the housing of the upper part (7).

The rotor (2) is provided with three cups (11) designed for enhanced mechanical properties, manufactured of a composite material of thermoset matrix and reinforced with glass chopped strands. Their dimensions have been calculated in order to achieve best performance under turbulent flows. The vane tail is manufactured by embedding the aluminium tail (12) inside the plastic tail head during the injection molding process. The plastic tail head is attached on the top of the rotating axle (8). A counterweight (13) balances the rotation axle (8).

The device is mounted on a boom of a meteorological tower. The connection of the device to the data logger is achieved by connecting a pluggable cable (10) underneath the base. The connection is fast and easy.

The principle of operation of my invention is based on the rotation of a bipolar magnet (4) above a magnetic encoder (5). The bipolar magnet (4) is firmly attached to the axle (8) of the rotor (2) and rotates with the same speed. The magnetic encoder (5) is controlled by the CPU which depending on the selected operating mode either translates the encoder's signal to rotational speed or to angular displacement.

The two operating modes interchanged through CPU programming is the innovation of the invention, due to the fact that the same device adapts its operation depending on the desired measured quantity wind speed or wind direction transduced by the relevant component attached on the top of the sensor.

It should also be noted that the object of the present invention should not be limited to the above described example. The accomplishment of this invention is also possible in other constructive ways, methods, fittings and machinery within the scope of the present specification.

The invention claimed is:

1. A device for measuring wind speed and direction, comprising:
   a hollow main body including an upper part and a lower part, the upper part having an elongate neck;
   an electronic circuit housed within the main body, the electronic circuit including a bipolar magnet above a magnetic encoder, the bipolar magnet being attached to the axle and rotating at the same speed as the axle;
   an axle in communication with the electronic circuit and extending through the elongate neck; and
   one of a rotor and a vane tail secured to a distal portion of the elongate neck and in communication with the axle, the rotor and vane tail being interchangeable, and the magnetic encoder being programmable to selectively measure the rotational speed of the bipolar magnet when the rotor is secured to the distal portion of the elongate neck and the angle of the bipolar magnet from an initial reference position when the vane tail is secured to the distal portion of the elongate neck.

2. The device of claim 1, wherein the electronic circuit is housed within the lower part.

3. The device of claim 1, wherein the rotor includes three cups.

4. The device of claim 3, wherein the cups are made of a composite material with a thermoset matrix and glass chopped strands as reinforcement.

5. The device of claim 1, wherein the vane tail includes a counterweight and a portion having a flat surface.

6. The device of claim 5, wherein the vane tail is made of aluminum.

7. A device for measuring wind speed and direction, comprising:
   a main body;
   an elongate neck extending upward from the main body;
   an axle coupled to the bipolar magnet and extending through the elongate neck, wherein the bipolar magnet rotates at the same speed as the axle; and
   one of a rotor and vane tail secured to a distal portion of the elongate neck and in communication with the axle, wherein the rotor includes three cups made of a composite material with a thermoset matrix and glass chopped strands as reinforcement, and wherein the vane tail is made of aluminum and consists of a flat surface and a counterweight to balance the rotation axle, the rotor and vane tail being interchangeably coupled to a distal portion of the elongate neck; and
   an electronic circuit within the main body, wherein the electronic circuit includes a bipolar magnet juxtaposed with a magnetic encoder, wherein the magnetic encoder is selectively programmable to measure a rotational speed of the bipolar magnet when the rotor is coupled to the distal portion of the elongate neck and a formed angle of the bipolar magnet from an initial reference position when the vane tail is coupled to the distal portion of the elongate neck.

8. The device of claim 6, wherein the portion having a flat surface and the counterweight and counterweight being are oriented in a plane that is substantially orthogonal to a longitudinal axis of the device.

9. A device for measuring the speed and direction of the wind, comprising:
   a bipolar magnet;
   a magnetic encoder; and
   one of a rotor and a vane tail, the rotor and vane tail being interchangeable,
   the magnetic encoder being selectively programmable to measure wind speed when the rotor is used and to measure wind direction when the vane tail is used.

* * * * *